United States Patent Office 3,336,267
Patented Aug. 15, 1967

3,336,267
CONTINUOUS PREPARATION OF THERMOPLASTIC COPOLYMERS AND TERPOLYMERS OF UNSATURATED CYCLIC ANHYDRIDES
Robert L. Zimmerman and Warren E. O'Connor, Midland, Mich., assignors to The Dow Chemical Company, Midland, Mich., a corporation of Delaware
No Drawing. Filed June 2, 1960, Ser. No. 33,376
20 Claims. (Cl. 260—78.5)

This invention concerns a method for the continuous production of solid, moldable copolymers and terpolymers of $\alpha,\beta$-unsaturated cyclic anhydrides and to the new copolymers and terpolymers prepared by this method. It relates more particularly to a method for making solid thermoplastic copolymers and terpolymers which are of exceptional uniformity of composition and which therefore possess useful properties that are not shared by products made in other ways.

It has previously been taught, U.S. Patent 2,769,804, that maleic anhydride may be continuously polymerized with styrene to produce solid, moldable copolymers. However, as $\alpha,\beta$-unsaturated cyclic anhydride monomers are solids and not readily soluble in alkenyl aromatic monomers, the method of this patent is of limited use. If an inert solvent is put in the feed it would not be possible to recycle the unconverted monomers and low boilng constituents without having a solvent build-up. Some solvents will not prevent gellation even when the materials are not recycled.

While it is possible to maintain the temperature of the cyclic anhydride feed above the melting point this results in extremely rapid reaction in the zone where the feeds first meet, thereby producing non-uniform copolymers. The introduction of a third monomer such as an acrylic or a methacrylic acid ester or acrylonitrile reduces the solubility problem somewhat; however, when using the method of U.S. Patent 2,769,804 the polymerizer tends to foul and plug under continuous operating conditions and the product contains undesirable amounts of insoluble gel particles. These problems also are present when copolymeric systems of alkenyl aromatic and cyclic anhydrides are being produced.

It is an object of this invention to provide a process for continuously preparing new, solid, thermoplastic copolymers and terpolymers of unsaturated cyclic anhydrides, monovinyl aromatic compounds of the benzene series, and/or acrylic or methacrylic acid $C_1$ to $C_4$ alkyl esters or acrylonitrile.

It is a further object to continuously prepare substantially homogeneous, gel-free, thermoplastic copolymers and/or terpolymers containing in uniform chemical combination from 5 to 40 mole percent of an $\alpha,\beta$-unsaturated cyclic anhydride, from 5 to 95 mole percent of a monovinyl aromatic compound of the benzene series, and, if desired, from 0 to 90 mole percent of methacrylic or acrylic acid esters. Alternatively, if desired, from 5 to 50 mole percent of acrylonitrile may be substituted for the methacrylic or acrylic acid $C_1$ to $C_4$ alkyl ester.

A still further object of this invention is to continuously prepare benzene soluble terpolymers of monovinyl aromatic compounds of the benzene series, $\alpha,\beta$-unsaturated cyclic anhydrides, and/or methacrylic or acrylic acid $C_1$ to $C_4$ alkyl esters or acrylonitrile.

Another object is to control the properties of the product being produced while being able to vary the production rate.

We have discovered an improved method for the continuous copolymerization of monovinyl aromatic compounds of the benzene series with $\alpha,\beta$-unsaturated cyclic anhydrides and/or methacrylic or acrylic acid $C_1$ to $C_4$ alkyl esters, or acrylonitrile whereby any or all of the above and related objects may be readily obtained. The method involves continuous feed of the desired monomer mixture into a polymerization system containing from 5 to 50 weight percent, preferably from about 10 to about 30 weight percent, based on total non-polymeric constituents in reactor of a solvent of the group consisting of aliphatic, cycloaliphatic and aromatic compounds containing up to 8 carbon atoms, at least one member of the group consisting of carbonyl and —C—O—C—, and wherein the O to C ratio in the ether compound is not less than 1 to 4, said compounds having a boiling point between about 50° and 225° C. Ester groups may be present in addition to the ketone or ether linkage. Compounds which are suitable include acetone, dioxane, methyl phenyl ketone, diethyl ether, methyl ethyl ketone, methyl isobutyl ketone, mesityl oxide, diacetone, ethyl acetoacetate, acetophenone, cyclohexanone, and the like. It is essential that the polymerizing mixture be agitated sufficiently to produce a uniform solution of polymer, monomer and solvent.

A portion of the polymerization mixture is continuously withdrawn and passed into a devolatilizer wherein the volatile materials are removed. The devolatilized polymer is subsequently recovered, e.g. by extrusion. The recovered volatiles may be recycled into the reactor if desired as indicated in U.S. Patent 2,769,804.

The products produced by the method of this invention have exceptional homogeneity. For example, when the product contains about 15 weight percent maleic anhydride, the optical transmission is 80% or better. In contrast, products produced by the methods taught in the prior art are substantially less homogeneous, and therefore allow less optical transmission.

Monovinyl aromatic compounds of the benzene series which are suitable include, for example, styrene, vinyltoluene, chlorostyrene, t-butyl styrene, dichlorostyrene and the like.

$\alpha,\beta$-Unsaturated cyclic anhydrides which are suitable include, for example, maleic anhydride, citraconic anhydride, itaconic anhydride, aconitic anhydride and the like.

Acrylic or methacrylic acid $C_1$ to $C_4$ alkyl esters which are suitable include, for example, ethyl acrylate, butyl acrylate, methyl methacrylate and the like. If desired, from 5 to 50 mole percent of acrylonitrile may be substituted for the acrylic or methacrylic acid esters. When acrylonitrile is used the absolute viscosity of the polymer solution should not exceed 20 cps. for a 10% solution in methyl ethyl ketone at 25° C.

The polymerization temperature may be any temperature from about 75° C. to about 200° C. The pressure in the reaction system may be any pressure from about 0 to about 1000 p.s.i.g.

The present invention may be further illustrated but is not to be construed as limited, by the following examples.

*Example I*

A liquid feed solution containing 50 parts by weight of styrene, 42 parts by weight of ethyl acrylate,, and 8 parts by weight of maleic anhydride was fed into a continuous polymerization system maintained at 180° C. and containing about 30 weight percent, based on total ingredients of methyl ethyl ketone. A major portion of the mixture was recycled through the polymerizer while a minor portion of the effluent mixture from the polymerizer was withdrawn and passed to a devolatilizing device where it was heated to about 210° C. at from 85 to 90 millimeters of mercury pressure absolute to vaporize volatile components. The volatile components thus removed from the terpolymer were condensed and recycled into admixture with the feed of styrene, ethyl acrylate and maleic anhydride. The devolatilized terpolymer, which constituted about 34 percent of the monomer-polymer effluent from the reactor, was extruded in continuous flow as a water-white optically clear product. By base titration in methyl ethyl ketone, the percent maleic anhydride was found to be 8.10. From this analysis and a C, H determination, the terpolymer contained 58.2 percent styrene and 33.7 percent ethyl acrylate. This terpolymer contained 3.9 percent volatiles and had a ten percent solution viscosity at 25° C. of about 3.5 centipoises in methyl ethyl ketone.

In a manner similar to that of Example I a series of terpolymers was prepared using various feed compositions. In some cases an additional proportion of methyl ethyl ketone was mixed with the feed as shown in the table. The results are given in the following table. In run 12 the volatile components were not recycled into the reactor.

The method may also be applied in making solid, moldable copolymers and terpolymers of $\alpha,\beta$-unsaturated cyclic ahydrides chemically combined in predetermined proportions which do not vary greatly throughout a body of the same.

The new copolymers and terpolymers of this invention are essentially homogenous, solid, thermoplastic, moldable products which can be extruded and formed into various shapes to make cups, tags, rings and other useful articles. They are also useful in coating formulations where the reactivity of the anhydride functional group makes it possible to build up the molecular weight and cross-link the polymer.

What is claimed is:

1. A method for continuously polymerizing a monomeric mixture to prepare essentially homogenous, gel-free, solid, thermoplastic copolymers and terpolymers of from 5 to 95 mole percent of a monovinyl aromatic compound of the benzene series, 5 to 40 mole percent of an $a,\beta$-unsaturated cyclic anhydride, and from 0 to 90 mole percent of a monoethylenically unsaturated organic compound selected from the group consisting of $C_1$ to $C_4$ alkyl esters of acrylic acid, and $C_1$ to $C_4$ alkyl esters

TABLE I

| Run | Feed Composition (parts by wt.) | | | | Maleic Anhydride by Tit. | From C, H | | Infrared | |
| --- | --- | --- | --- | --- | --- | --- | --- | --- | --- |
| | Styrene | Ethyl Acrylate | Maleic Anhydride | Methyl Ethyl Ketone | | Percent Ethyl Acrylate | Percent Styrene | Percent Styrene | Ethyl Acrylate |
| 1 | 50 | 45 | 5 | 5 | 5.3 | 39.5 | 55.2 | 53.3 | 42.6 |
| 2 | 42 | 50 | 8 | 0 | 8.5 | | | 43.8 | 48.8 |
| 3 | 45 | 45 | 10 | 0 | 10.4 | | | 55.4 | 36.2 |
| 4 | 42.5 | 42.5 | 15 | 5 | 15.5 | | | 49.9 | 37.6 |
| 5 | 42.5 | 42.5 | 15 | 5 | 19.8 | 28.1 | 52.1 | 50.3 | 32.1 |
| 6 | 75 | 15 | 10 | 10 | 14.3 | | | 80.8 | 12.1 |
| 7 | 35 | 35 | 30 | 10 | 29.0 | 24.0 | 47.0 | 45.6 | 26.5 |
| 8 | 25 | 65 | 10 | 0 | 11.2 | 45.5 | 43.3 | 41.4 | 49.1 |
| 9 | 25 | 30 | 25 | 0 | 22.6 | 31.3 | 46.1 | 46.7 | 32.5 |
| 10 | 65 | 15 | 20 | 15 | 18.6 | 13.3 | 68.1 | 69.3 | 14.0 |
| 11 | 50 | 25 | 25 | 10 | 23.6 | | | 59.1 | 18.5 |
| 12 | 65 | [1] 30 | 5 | 40 | 6.71 | | | 62.3 | [1] 29.9 |
| 13 | [2] 42 | 50 | 8 | 0 | 10.8 | | | [2] 48.2 | 43.0 |
| 14 | 10 | 80 | 10 | 0 | 9.3 | | | 16.5 | 75.8 |
| 15 | 10 | 80 | 10 | 0 | 14.0 | | | 20.3 | 70.0 |
| 16 | 30 | [3] 55 | 15 | 5 | 15.0 | 51.6 | 41.5 | 35.9 | [3] 50.8 |
| 17 | 35 | [3] 55 | 10 | 0 | 10.8 | | | 40.6 | [3] 50.0 |
| 18 | 60 | [4] 10 | 30 | 27 | 33.5 | | | 69.5 | [4] 8.0 |

[1] Acrylonitrile.  [2] Vinyltoluene.  [3] Methyl methacrylate.  [4] Butyl acrylate.

*Example II*

Using a procedure similar to that of Example I a series of copolymers containing varying percentages of maleic anhydride were prepared. The results are given in the following Table II. The volatile components from runs 1, 2, 3, and 10 were recycled into the reactor. In the remaining runs they were discarded.

TABLE II

| Run | Feed Composition (parts by wt.) | | | Wt. Percent MEK in Reactor (based on non-polymeric constituents) | Polymer Temp., °C. | Solution Viscosity (10% in MEK at 25° C.) | Product, Percent MA (Titration) |
| --- | --- | --- | --- | --- | --- | --- | --- |
| | Styrene | Maleic Anhydride | Methyl Ethyl Ketone | | | | |
| 1 | 90 | 7 | 3 | 3.5 | 115.0 | 7.2 | [6] 8.2 |
| 2 | 90 | 7 | 3 | 7.6 | 157.0 | 5.4 | 8.8 |
| 3 | 87 | 13 | 2 | 26.0 | 163.0 | 2.0 | 12.8 |
| 4 | 96 | 4 | 10 | 13.2 | 140.0 | 4.4 | 7.47 |
| 5 | 96 | 4 | 25 | 32.5 | 141.5 | 4.0 | 7.27 |
| 6 | 96 | 4 | 40 | 49.0 | 140.0 | 3.2 | 6.15 |
| 7 | 96 | 4 | 40 | 38.2 | 100.0 | 3.8 | 11.5 |
| 8 | 96 | 4 | 10 | | 180.0 | 2.8 | 6.5 |
| 9 | 80 | 10 | 10 | 12.0 | 165.0 | 3.8 | 30.0 |
| 10 | 72 | 13 | [1] 15 | | 132.0 | 3.8 | 20.0 |
| 11 | 65 | 15 | 20 | | 165.0 | 3.4 | 32.4 |
| 12 | 90 | 10 | [2] 10 | | 190.0 | | 19.4 |
| 13 | [4] 75 | 7.5 | [3] 17.5 | | 180.0 | | 13.5 |
| 14 | 93 | 7.0 | [5] 10.0 | | 127.0 | | 18.0 |

[1] Solvent was acetone.
[2] Also contained 47 parts xylene.
[3] Solvent was methyl isobutyl ketone.
[4] Vinyltoluene.
[5] Solvent was dioxane.
[6] Contained gels.

of methacrylic acid, comprising essentially (I) continuously feeding said monomeric mixture into a polymerization system maintained at from about 75° to about 200° C. said monomeric mixture also containing from 5 to 50 weight percent of a solvent selected from the group consisting of at least one aliphatic ketone, cycloaliphatic ketone, aromatic ketone, aliphatic ether ketone, cycloaliphatic ether ketone, aliphatic ether, cycloaliphatic ether, and aromatic ether which solvents are inert under the aforesaid reaction conditions and which contain up to 8 carbon atoms and wherein the oxygen to carbon ratio in said ether compounds is not less than 1 to 4, said solvents having a boiling point within the range of from 50° C. to 225° C., (II) continuously withdrawing a portion of the polymerizing mixture at a rate substantially equivalent to the rate at which said monomer mixture and solvent are fed into the polymerizer, and (III) recovering the product therefrom.

2. Method in accordance with claim 1 wherein the solvent is acetone.

3. Method in accordance with claim 1 wherein the solvent is methyl ethyl ketone.

4. Method in accordance with claim 1 wherein the solvent is methyl isobutyl ketone.

5. Method of claim 1 wherein the monovinyl aromatic compound of the benzene series is styrene, the $a,\beta$-unsaturated cyclic anhydride is maleic anhydride and the $C_1$ to $C_4$ akyl ester of acrylic acid is ethyl acrylate.

6. Method of claim 1 wherein the monomers are styrene, maleic anhydride and butyl acrylate.

7. Method of claim 1 wherein the monomers are styrene, maleic anhydride and methyl methacrylate.

8. Method of claim 1 wherein the monomers are styrene and maleic anhydride.

9. Method of claim 2, wherein said monovinyl aromatic compound of the benzene series is styrene, said $a,\beta$-unsaturated cyclic anhydride is maleic anhydride and said $C_1$ to $C_4$ alkyl ester of acrylic acid is ethyl acrylate.

10. Method of claim 3, wherein said monovinyl aromatic compound of the benzene series is styrene, said $a,\beta$-unsaturated cyclic anhydride is maleic anhydride and said $C_1$ to $C_4$ alkyl ester of acrylic acid is ethyl acrylate.

11. Method of claim 4, in wherein said monovinyl aromatic compound of the benzene series is styrene, said $a,\beta$-unsaturated cyclic anhydride is maleic anhydride and said $C_1$ to $C_4$ alkyl ester of acrylic acid is ethyl acrylate.

12. Method of claim 2, wherein the monomers are styrene, maleic anhydride and butyl acrylate.

13. Method of claim 3, wherein the monomers are styrene, maleic anhydride and butyl acrylate.

14. Method of claim 4, wherein the monomers are styrene, maleic anhydride and butyl acrylate.

15. Method of claim 2, wherein the monomers are styrene, maleic anhydride and methyl methacrylate.

16. Method of claim 3, wherein the monomers are styrene, maleic anhydride and methyl methacrylate.

17. Method of claim 4, wherein the monomers are styrene, maleic anhydride and methyl methacrylate.

18. Method of claim 2, wherein the monomers are styrene and maleic anhydride.

19. Method of claim 3, wherein the monomers are styrene and maleic anhydride.

20. Method of claim 4, wherein the monomers are styrene and maleic anhydride.

References Cited

UNITED STATES PATENTS

| | | | |
|---|---|---|---|
| 2,392,139 | 1/1946 | Gerhart | 260—78.5 |
| 2,606,891 | 8/1952 | Rowland | 260—78.5 |
| 2,675,370 | 4/1954 | Barrett | 260—95 |
| 2,719,143 | 9/1955 | Van Dijk | 260—92.8 |
| 2,769,804 | 11/1956 | Hanson | 260—95 |
| 2,912,413 | 11/1959 | Baer | 260—75 |
| 2,967,855 | 1/1961 | Lang | 260—67 |
| 2,971,939 | 2/1961 | Baer | 260—78.5 |
| 3,085,986 | 4/1963 | Muskat | 260—78.5 |

FOREIGN PATENTS 816,618  7/1959  Great Britain.

OTHER REFERENCES

Schildknecht: Polymer Processes, Interscience (1956), pages 185, 187 and 188.

JOSEPH L. SCHOFER, *Primary Examiner.*

PHILLIP MANGAN, HAROLD BURSTEIN, J. R. LIBERMAN, DONALD E. CZAJA, *Examiners.*

N. G. TORCHIN, L. WOLF, J. KIGHT,
*Assistant Examiners.*